(12) United States Patent
Johnson et al.

(10) Patent No.: US 11,021,187 B2
(45) Date of Patent: Jun. 1, 2021

(54) STEERING KNUCKLE AND METHOD OF MAKING THE SAME

(71) Applicant: ILJIN USA Corporation, Novi, MI (US)

(72) Inventors: Ron J. Johnson, Novi, MI (US); Jeremy S. Mercer, Novi, MI (US)

(73) Assignee: ILJIN USA Corporation, Novi, MI (US)

( * ) Notice: Subject to any disclaimer, the term of this patent is extended or adjusted under 35 U.S.C. 154(b) by 247 days.

(21) Appl. No.: 15/967,849

(22) Filed: May 1, 2018

(65) Prior Publication Data

US 2019/0176886 A1    Jun. 13, 2019

Related U.S. Application Data

(60) Provisional application No. 62/596,151, filed on Dec. 8, 2017.

(51) Int. Cl.
  *B62D 7/18* (2006.01)
  *B22C 9/24* (2006.01)
  *B22D 25/02* (2006.01)

(52) U.S. Cl.
  CPC .............. *B62D 7/18* (2013.01); *B22C 9/24* (2013.01); *B22D 25/02* (2013.01)

(58) Field of Classification Search
  CPC .. B22D 19/04; B22D 21/04; B21J 5/00; B21J 5/002; B22C 9/101; B22C 9/24; B62D 7/18; B62D 25/02
  See application file for complete search history.

(56) References Cited

U.S. PATENT DOCUMENTS

| | | | | |
|---|---|---|---|---|
| 1,721,606 A | * | 7/1929 | Sullenger | B62D 7/18 |
| | | | | 280/124.126 |
| 3,940,159 A | * | 2/1976 | Pringle | B62D 7/18 |
| | | | | 280/88 |

(Continued)

FOREIGN PATENT DOCUMENTS

| | | |
|---|---|---|
| CN | 104276209 A | 1/2015 |
| EP | 0980814 A2 | 2/2000 |

(Continued)

OTHER PUBLICATIONS

International Search Report and Written Opinion; dated Apr. 1, 2019; Application No: PCT/US2018/064272; 13 pages.

*Primary Examiner* — Paul N Dickson
*Assistant Examiner* — Timothy Wilhelm
(74) *Attorney, Agent, or Firm* — Dinsmore & Shohl LLP; Yongsok Choi, Esq.

(57) ABSTRACT

A steering knuckle is used in a motor vehicle and is typically positioned adjacent a front wheel thereof. The steering knuckle includes a central portion, a steering knuckle arm, an upper portion and a lower portion. The steering knuckle arm, the upper portion and the lower portion may each be contoured with full or partial roulette contoured surfaces (i.e., surfaces defined by roulette curves), and the upper portion may transition from a hollow lower portion to a solid upper portion defining an I-beam. A dual-beam horizontal support is formed in the central portion. The steering knuckle is formed from a casting process, and the roulette curvature of the steering knuckle arm, the upper portion and the lower portion provide draft to the surfaces of the steering knuckle which are perpendicular to the parting line of the casting mold, allowing the steering knuckle to be easily removed from the casting mold.

40 Claims, 15 Drawing Sheets

(56) References Cited

U.S. PATENT DOCUMENTS

| | | | | |
|---|---|---|---|---|
| 4,565,389 | A | * | 1/1986 | Kami .................. B60G 21/055 180/256 |
| 4,842,296 | A | * | 6/1989 | Kubo ....................... B60G 3/26 280/124.136 |
| 4,878,688 | A | | 11/1989 | Kubo |
| 4,951,959 | A | * | 8/1990 | Watanabe ................ B60G 3/26 280/124.136 |
| 5,120,150 | A | * | 6/1992 | Kozyra .................. B60G 7/008 403/24 |
| 5,366,233 | A | * | 11/1994 | Kozyra .................. B60T 1/065 280/93.512 |
| 5,380,035 | A | * | 1/1995 | Lee ....................... B60G 3/265 280/124.143 |
| 5,496,055 | A | * | 3/1996 | Shibahata ............. B60G 3/265 267/188 |
| 5,829,768 | A | * | 11/1998 | Kaneko .................... B21K 1/74 280/93.502 |
| 6,099,003 | A | * | 8/2000 | Olszewski ............... B62D 7/18 280/93.512 |
| D538,316 | S | * | 3/2007 | Sadanowicz ................ D15/143 |
| 7,234,712 | B2 | * | 6/2007 | Yamazaki ................ B60G 3/20 280/93.51 |
| 7,398,982 | B2 | * | 7/2008 | Hozumi .................. B60G 3/20 280/93.512 |
| 8,061,726 | B2 | * | 11/2011 | Kunert .................... B60G 3/20 280/124.106 |
| 8,444,160 | B2 | * | 5/2013 | Okamoto ................ B60G 3/20 280/124.135 |
| 8,701,741 | B2 | | 4/2014 | Di Serio |
| 9,254,724 | B2 | | 2/2016 | Corby et al. |
| 9,308,578 | B2 | * | 4/2016 | Smerecky ................ B22C 9/02 |
| D755,687 | S | | 5/2016 | Conner et al. |
| D764,359 | S | | 8/2016 | Conner et al. |
| D764,360 | S | | 8/2016 | Conner et al. |
| 9,403,564 | B1 | * | 8/2016 | Al-Huwaider ....... B62D 35/007 |
| 9,643,646 | B2 | * | 5/2017 | Conner .................... B62D 7/18 |
| 9,643,647 | B2 | * | 5/2017 | Conner .................... B62D 7/18 |
| 9,796,235 | B2 | * | 10/2017 | Matayoshi ........... B60G 15/062 |
| 10,315,695 | B2 | * | 6/2019 | Kleemann ............... B62D 7/18 |
| 10,377,418 | B2 | * | 8/2019 | Sakuma ............ B29C 66/72141 |
| 10,414,228 | B2 | * | 9/2019 | Bosch .................... B60G 7/008 |
| D864,798 | S | * | 10/2019 | Sun ............................... D12/159 |
| 2003/0010412 | A1 | * | 1/2003 | Matsumoto ................ B21J 5/00 148/552 |
| 2003/0107201 | A1 | * | 6/2003 | Chun ....................... B60G 3/20 280/124.135 |
| 2004/0151615 | A1 | * | 8/2004 | Kotani ...................... B21J 1/06 420/544 |
| 2005/0247502 | A1 | * | 11/2005 | Ziech .................... B60G 7/008 180/253 |
| 2005/0258608 | A1 | | 11/2005 | McGaughy |
| 2011/0025009 | A1 | * | 2/2011 | Neumann .................. B21J 5/00 280/124.1 |
| 2012/0049477 | A1 | * | 3/2012 | Webster ................ B22D 18/04 280/93.512 |
| 2016/0090121 | A1 | * | 3/2016 | Conner .................... B62D 7/18 280/93.512 |
| 2016/0159392 | A1 | | 6/2016 | Hoffmann |
| 2016/0236268 | A1 | | 8/2016 | Fukumoto |
| 2017/0080481 | A1 | | 3/2017 | Fukumoto |
| 2018/0111435 | A1 | * | 4/2018 | Bosch ...................... B62D 7/18 |
| 2019/0256135 | A1 | * | 8/2019 | Kwon ...................... B62D 7/18 |

FOREIGN PATENT DOCUMENTS

| | | |
|---|---|---|
| JP | 2001187583 A | 7/2001 |
| JP | 2007083778 A | 4/2007 |
| JP | 2017071311 A | 4/2017 |

* cited by examiner

STEERING KNUCKLE AND METHOD OF MAKING THE SAME

CROSS-REFERENCE TO RELATED APPLICATION

This application claims the benefit of U.S. Provisional Patent Application Ser. No. 62/596,151, filed on Dec. 8, 2017.

BACKGROUND

1. Field

The present disclosure of the present patent application relates to motor vehicle components, and particularly to a steering knuckle for a motor vehicle, as well as a casting-based method of making the steering knuckle.

2. Description of the Related Art

A steering knuckle is a common motor vehicle component, typically positioned adjacent to each front wheel of the vehicle. The steering knuckle provides support for the wheel bearing, as well as providing a mechanical connection between the vehicle chassis, the shock absorber or suspension strut for the wheel, and the steering system of the vehicle. Steering knuckles are typically produced as unitary bodies from casting, forging and cast-forged processes.

Steering knuckles are commonly manufactured with a "goose neck" extension. The "goose neck" extension is typically either rectangular in cross-section and fully hollow (using an enclosed core in the casting process) or fully solid (manufactured without a core). The rectangular fully hollow design suffers from stress concentrations in the contour of the rectangle and a thinner core in the upper portion of the "goose neck", creating potential for the core to break during handling, while the fully solid design suffers in terms of overall weight of the steering knuckle.

A common casting process for producing steering knuckles, as well as a wide variety of other metallic pieces, is mold casting. Casting is a process characterized by using sand, metal or plastic as the mold material. For sand molds, mold cavities and a gate system are created by compacting the sand around models, referred to as "patterns", by carving directly into the sand, or by 3-D printing. For permanent molds, the mold cavities and gate system are created by machining the pattern directly in the mold.

In most casting processes, such as sand casting, permanent mold casting and the like, draft is a consideration. The part to be made and its pattern must be designed to accommodate each stage of the process, as it must be possible to remove the pattern without disturbing the molding sand and to have proper locations to receive and position any cores. A slight taper, known as "draft", must be used on surfaces perpendicular to the parting line, in order to be able to remove the pattern from the mold. Typical steering knuckles, however, are commonly designed with right angle edges and other contouring which does not take draft into consideration, thus additional material is typically added to create draft, resulting in increased weight of the steering knuckle. Thus, a steering knuckle and method of making the same solving the aforementioned problems are desired.

SUMMARY

The steering knuckle is used in a motor vehicle and is typically positioned adjacent a front wheel thereof. According to one embodiment of the present disclosure, the steering knuckle includes a central portion, a steering knuckle arm, an upper portion and a lower portion. The central portion provides support for a wheel bearing of the motor vehicle and may have an aperture formed therethrough, allowing for passage of a drive shaft for the wheel. The steering knuckle arm has opposed first and second ends, with the first end thereof being joined to the central portion. The steering knuckle arm projects longitudinally from the central portion, with the second end of the steering knuckle arm being free.

According to one embodiment of the present disclosure, the upper portion has opposed first and second ends, with the first end thereof being joined to the central portion. The upper portion projects vertically from the central portion, with the second end of the upper portion being free. In a non-limiting example, a cross-sectional contour of the upper portion, taken in a longitudinal-lateral plane, may define a pair of curves, where each curve may be an ellipse, a parabola, a cycloid, a catenary or half of a cissoid of Diocles, and may also be joined by a fillet of sufficient radius. The upper portion is divided into a first portion adjacent the first end and a second portion adjacent the second end. The first portion may be at least partially hollow, and the second portion is, in some embodiments, solid. The second portion, in some embodiments, at least partially defines an I-beam having a substantially I-shaped cross-sectional contour.

According to one embodiment of the present disclosure, the lower portion has opposed first and second ends, with the first end thereof being joined to the central portion. The lower portion is vertically opposed to the upper portion and projects vertically down from the central portion, with the second end of the lower portion being free. The central portion has a floor which separates the central portion from the lower portion. At least one longitudinally-extending beam is mounted in the central portion, with the at least one longitudinally-extending beam and the floor providing internal support.

According to one embodiment of the present disclosure, the steering knuckle may be manufactured by a horizontal casting process. A horizontal casting mold is defined by cope (or upper) and drag (or lower) portions. When the cope and drag portions are placed together, the cope and drag molds define an overall molding cavity. A removable core, formed from a material that can be removed after the metal solidifies, such as sand or salt, for example, is placed in the molding cavity and, similar to a conventional casting process, the molding cavity is filled with molten metal. The molten metal is allowed to cool, solidifying into the steering knuckle, as described above. The cope and drag portions of the casting mold are parted, and the removable core and steering knuckle are removed from the casting mold. The removable core is then separated from the steering knuckle. A vertical-longitudinal parting plane is defined between the cope and drag portions of the casting mold, and a vertical-lateral plane of the removable core and a vertical-longitudinal plane of the molding cavity are either orthogonal or parallel to the parting plane. It should be understood that the casting process may alternatively be a vertical casting process.

These and other features of the present disclosure will become readily apparent upon further review of the following specification.

BRIEF DESCRIPTION OF THE DRAWINGS

Similar reference characters denote corresponding features consistently throughout the attached drawings.

DETAILED DESCRIPTION

Figure 1:
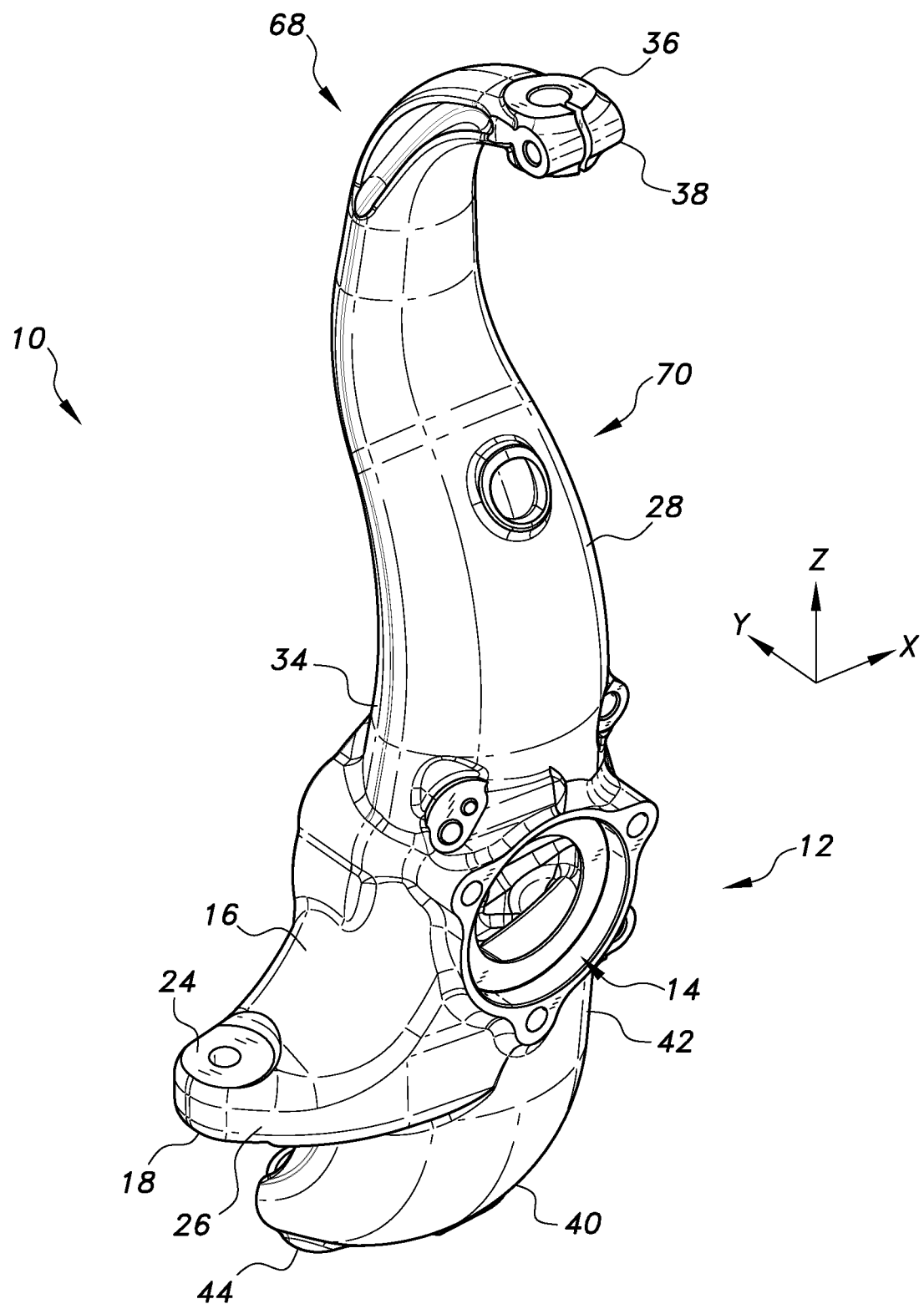
FIG. 1 is a front, outboard lateral view of a steering knuckle.
Figure 2:
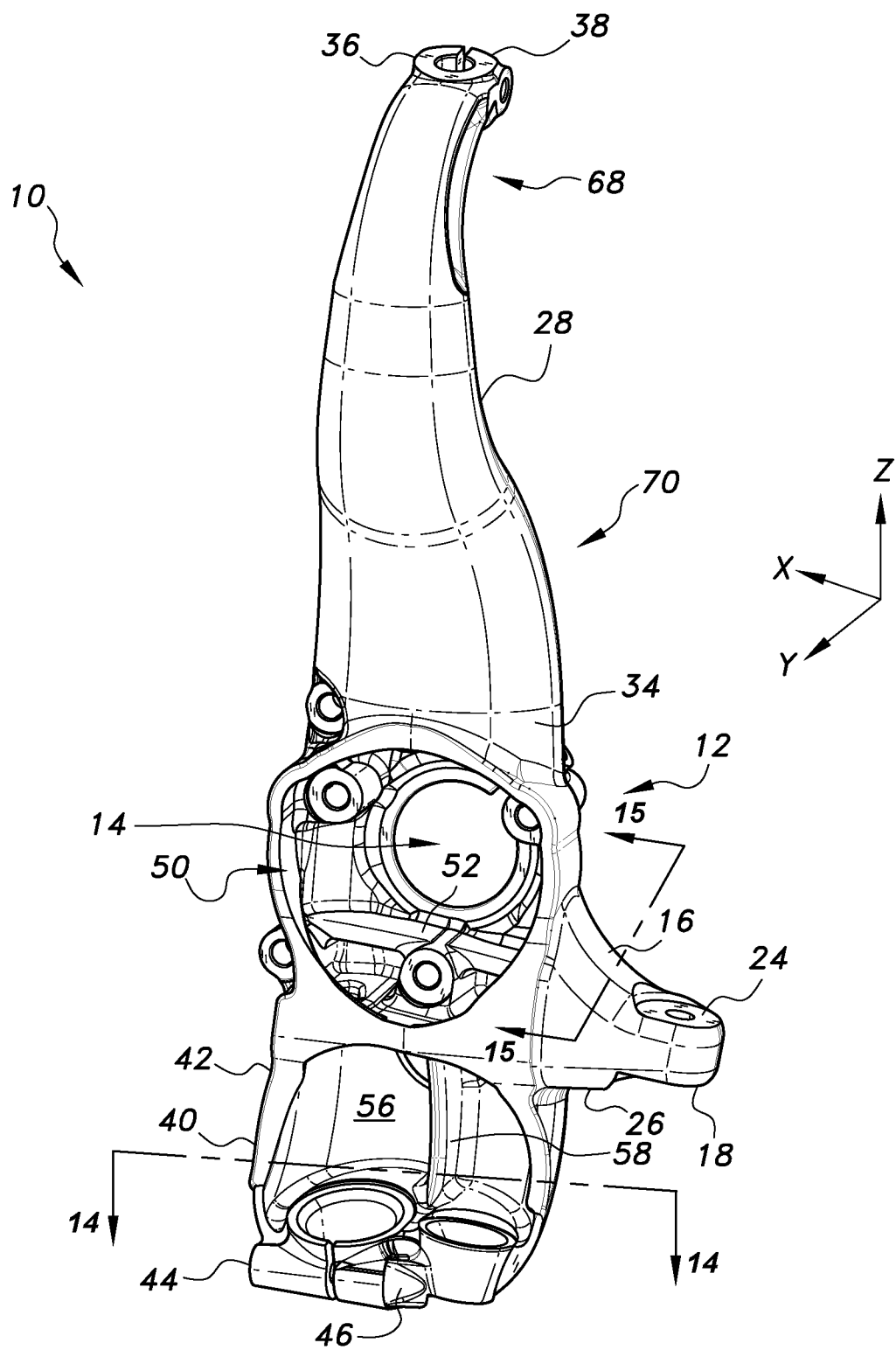
FIG. 2 is a front, inboard lateral view of the steering knuckle.
Figure 3:
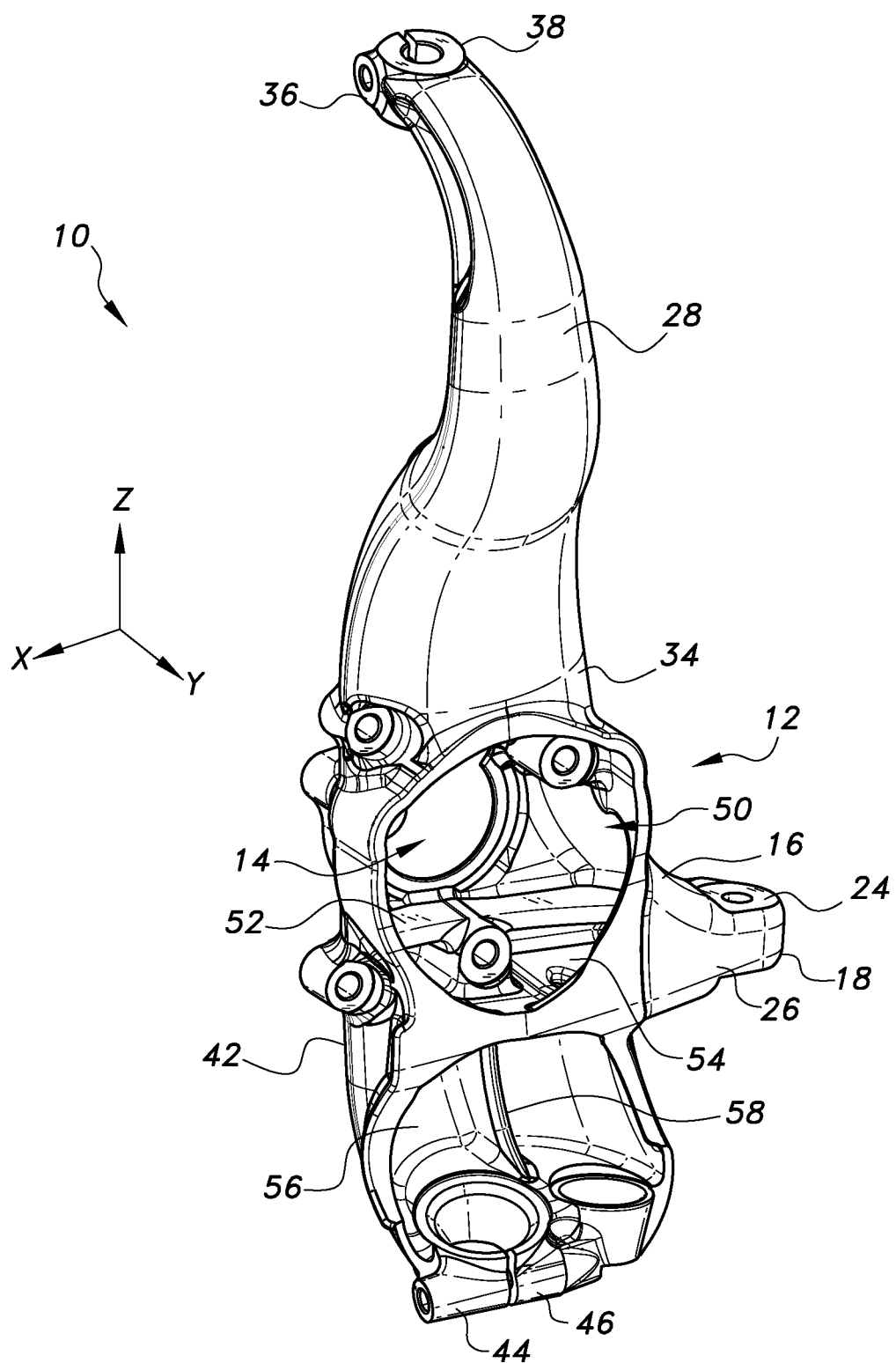
FIG. 3 is a rear, inboard lateral view of the steering knuckle.

The steering knuckle 10 is used in a motor vehicle and is typically positioned adjacent a front wheel thereof. As shown in FIGS. 1-3, the steering knuckle 10 includes a central portion 12, a steering knuckle arm 26, an upper portion 28 and a lower portion 40. As will be described in greater detail below, the steering knuckle 10 may be manufactured through a casting process, such that the central portion 12, the steering knuckle arm 26, the upper portion 28 and the lower portion 40 are formed as an integral, one-piece body. Although the vehicle or its parts, such as the bearing, are not illustrated, it should be understood that the steering knuckle 10 is manufactured in such a way, as will be described in detail below, to form a shield around the vehicle bearing and the outer portion of a drive shaft.

The central portion 12 provides support for a wheel bearing of the motor vehicle. In the non-limiting example shown in FIGS. 1-3 and 5, the central portion 12 has an aperture 14 formed therethrough, allowing for passage of a part of the wheel bearing. It should be understood that central portion 12 may alternatively be formed continuously; i.e., without an additional aperture. As shown in FIGS. 2 and 3, the central portion 12 is hollow and has an open end 50, with the open end 50 being laterally (i.e., along the Y-axis) opposed to the aperture 14. As seen in FIG. 3, a floor 54 of central portion 12 is substantially horizontal (i.e., it extends along the longitudinal-lateral, or X-Y, plane). A horizontal beam 52 is provided adjacent the floor 54, defining a dual-horizontal beam internal support (with floor 54) for steering knuckle 10.

The steering knuckle arm 26 has opposed first and second ends 16, 18, respectively, with the first end 16 being joined to the central portion 12. As noted above, steering knuckle arm 26 and central portion 12 are, in some embodiments, cast as an integral, one-piece body. The steering knuckle arm 26 projects longitudinally from the central portion 12 (i.e., along the X-axis in FIGS. 1 and 2), with the second end 18 of the steering knuckle arm 26 being free. As shown in FIGS. 1 and 2, a first mounting bracket 24 may be formed on the second end 18 of the steering knuckle arm 26. Similar to a conventional steering knuckle, the first mounting bracket 24 may be provided for connection to the steering system of the motor vehicle.

Figure 5:
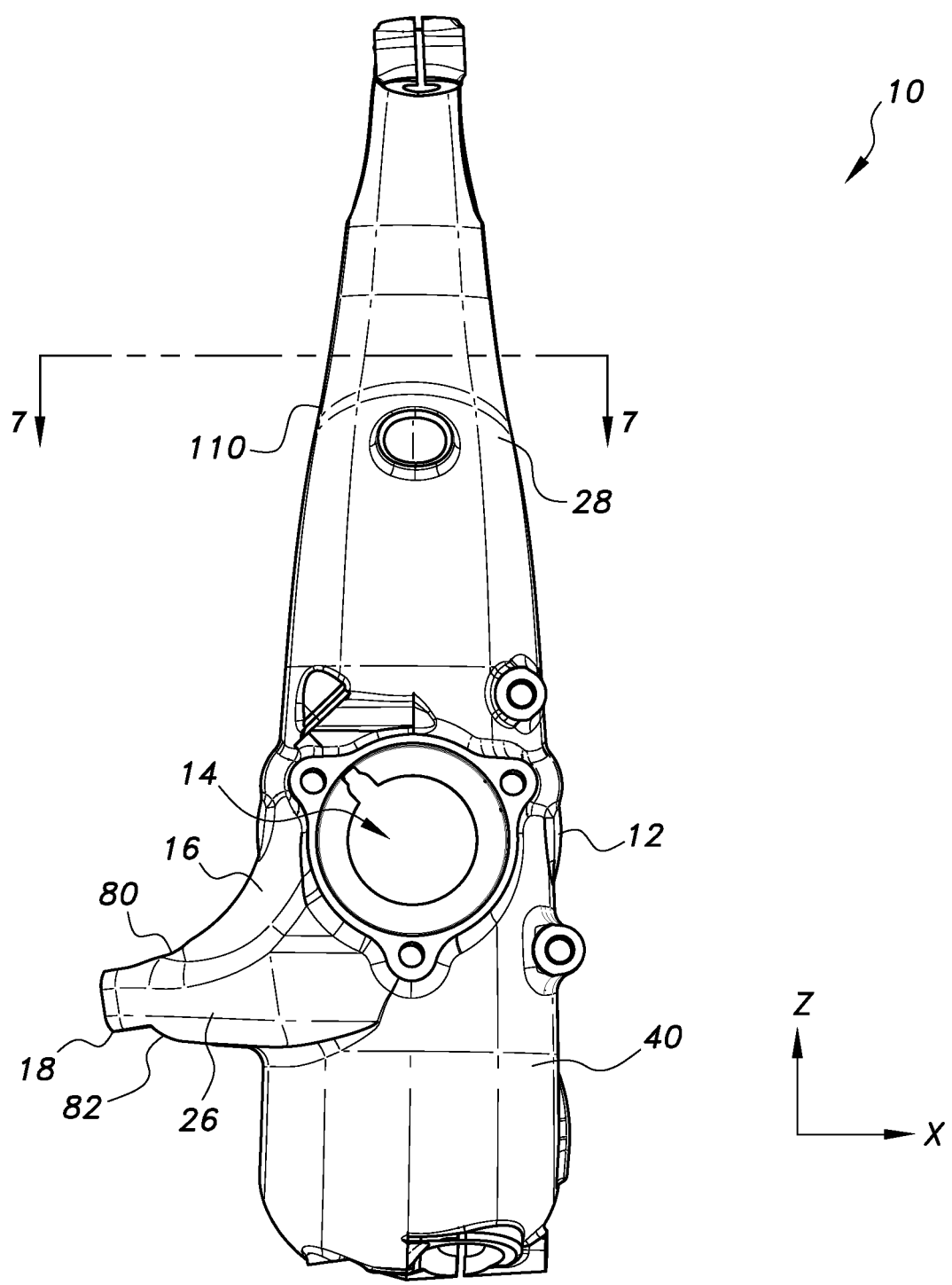
FIG. 5 is a side view of the steering knuckle.
Figure 13:
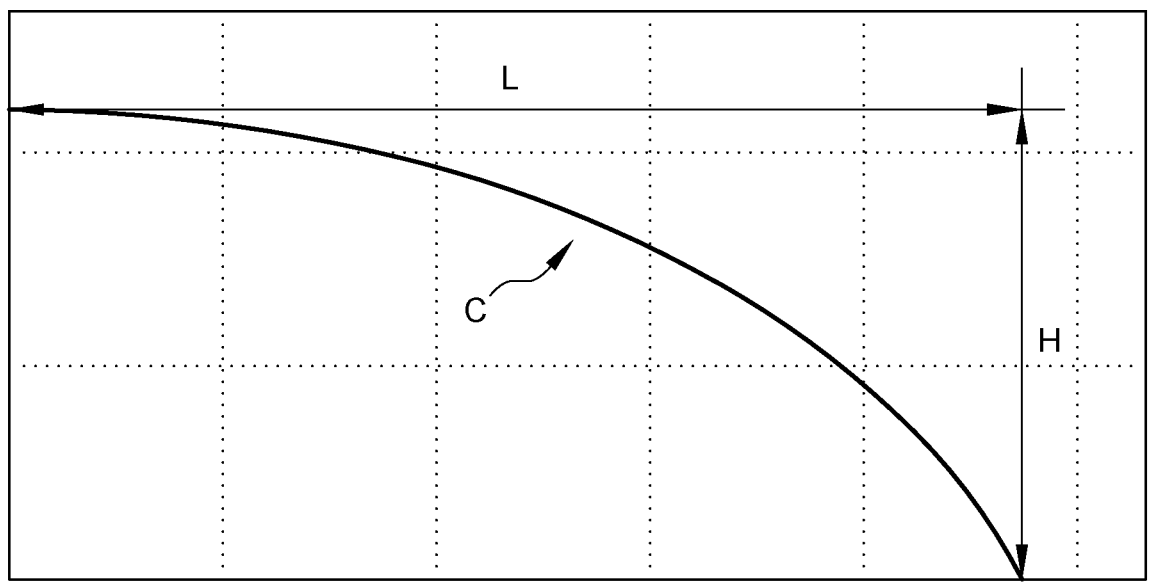
FIG. 13 is a graph illustrating exemplary curve parameters associated with the steering knuckle.

As shown in FIG. 5, the steering knuckle arm 26 has upper and lower vertically opposed (i.e., opposed with respect to the Z-axis) side edges 80, 82, respectively. The contouring of upper side edge 80 may be defined by a curve that is defined by an equation with a length-to-height ratio between 1.3 and 1.8 inclusive (where length is defined tangent to the curve, with the height being orthogonal to the length), and in which the second derivative is non-zero and continuous. For such curves, the coefficient of determination, $R^2$, in some embodiments, satisfies the requirement that $R^2 \geq 0.98$, when compared to a cycloid or an ellipse. Alternatively, a coefficient of determination satisfying the requirement that $R^2 \geq 0.95$, when compared to a cycloid or ellipse, is also contemplated. It should be understood that the coefficient of determination, $R^2$, as used herein, has the conventional definition; i.e., $R^2$ is a key output of regression analysis which is interpreted as the proportion of the variance in the dependent variable that is predictable from the independent variable. Here, with regard to curves specifically, $R^2$ indicates how well the curve "fits" or matches against the comparison curve (i.e., a cycloid or an ellipse). FIG. 13 diagrammatically illustrates such a curve, C, in which the length, L, is defined as starting tangent to curve C (on the left in the exemplary orientation of FIG. 13), and the height, H, is perpendicular to length L. Curve C may belong to the set of curves known as a roulette. As is well known in the field of differential geometry, roulette curves include cycloids, epicycloids, hypocycloids, trochoids, involutes, catenaries, ellipses, parabolas, elliptic catenaries, hyperbolic catenaries, and the cissoid of Diocles. In some embodiments, curve C is defined, either fully or partially, by a roulette curve, such as, for example, an ellipse, a parabola, a cycloid, a catenary, or half of a cissoid of Diocles. It should be understood that the upper side edge 80 may encompass any such curve fully or may be partially contoured as a fraction of such a curve.

Figure 11:
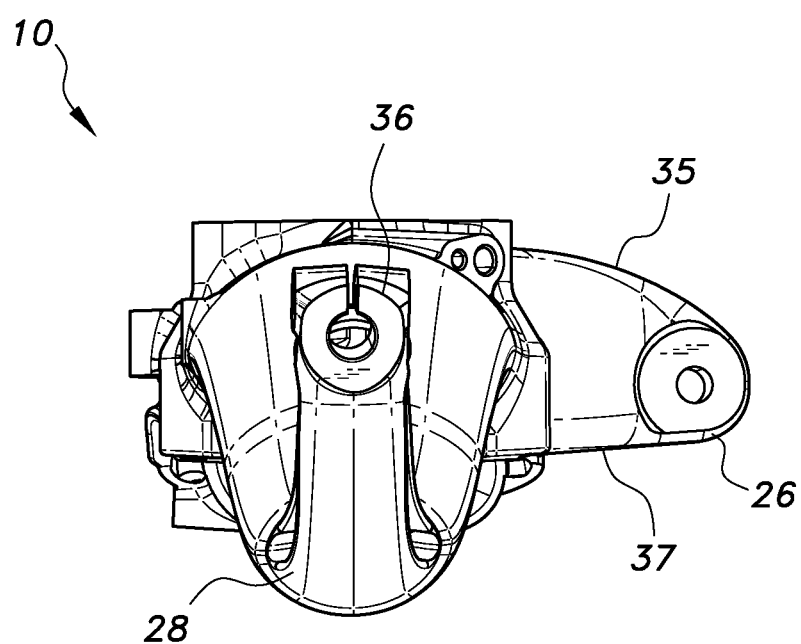
FIG. 11 is a top view of the steering knuckle.

Further, as shown in FIG. 11, the steering knuckle arm 26 has laterally opposed first and second side edges 35, 37 (along the Y-axis), respectively, and the first side edge 35 may have a cycloidal curvature. However, it should be understood that first side edge 35 may have any suitable contouring, such as, for example, first side edge 35 may have an elliptical curvature (as a non-limiting example). The contouring of first side edge 35 may be defined by a curve that is defined by an equation with a length-to-height ratio between 1.3 and 1.8 inclusive (where length is defined tangent to the curve, with the height being orthogonal to the length), and in which the second derivative is non-zero and continuous. For such curves, the coefficient of determination, $R^2$, in some embodiments, satisfies the requirement that $R^2 \geq 0.98$, when compared to a cycloid or an ellipse. Alternatively, a coefficient of determination satisfying the requirement that $R^2 \geq 0.95$, when compared to a cycloid or ellipse, is also contemplated. As described above, with respect to FIG. 13, the curve is, in some embodiments, defined, either fully or partially, by a roulette curve, such as, for example, an ellipse, a parabola, a cycloid, a catenary, or half of a cissoid of Diocles. It should be understood that the first side edge 35 may encompass any such curve fully or may be partially contoured as a fraction of such a curve. As such, it should be understood that, as used herein, reference to a particular type of curve may refer either to a full curve or a partial curve. As a non-limiting example, the term "cycloidal", as used herein, may refer to either a full cycloid curve or a partial cycloid curve.

Figure 15:
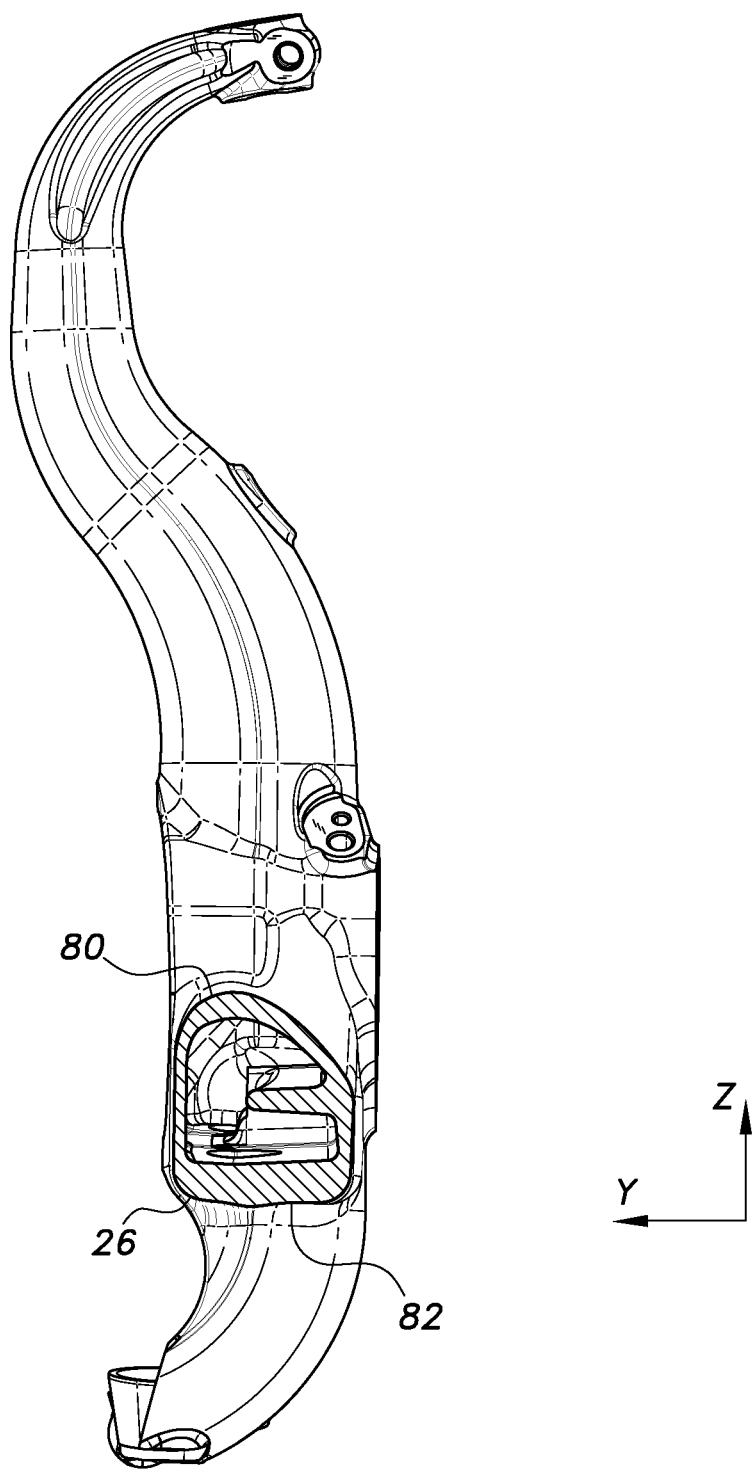
FIG. 15 is a cross-sectional view of a steering knuckle arm of the steering knuckle, taken along view lines 15-15 of FIG. 2.

Additionally, as shown in the vertical-lateral (Z-Y) cross-section of FIG. 15, both upper side edge 80 and lower side edge 82 may also each be defined by a curve that is defined by an equation with a length-to-height ratio between 1.3 and 1.8 inclusive (where length is defined tangent to the curve, with the height being orthogonal to the length), and in which the second derivative is non-zero and continuous. For such curves, the coefficient of determination, $R^2$, in some embodiments, satisfies the requirement that $R^2 \geq 0.98$, when compared to a cycloid or an ellipse. Alternatively, a coefficient of determination satisfying the requirement that $R^2 \geq 0.95$, when compared to a cycloid or ellipse, is also contemplated. As described above, with respect to FIG. 13, the curve is, in some embodiments, defined, either fully or partially, by a roulette curve, such as, for example, an ellipse, a parabola, a cycloid, a catenary, or half of a cissoid of Diocles. It should be understood that the upper side edge 80 and the lower side edge 82 may each encompass any such curve fully or may be partially contoured as a fraction of such a curve.

Figure 4:
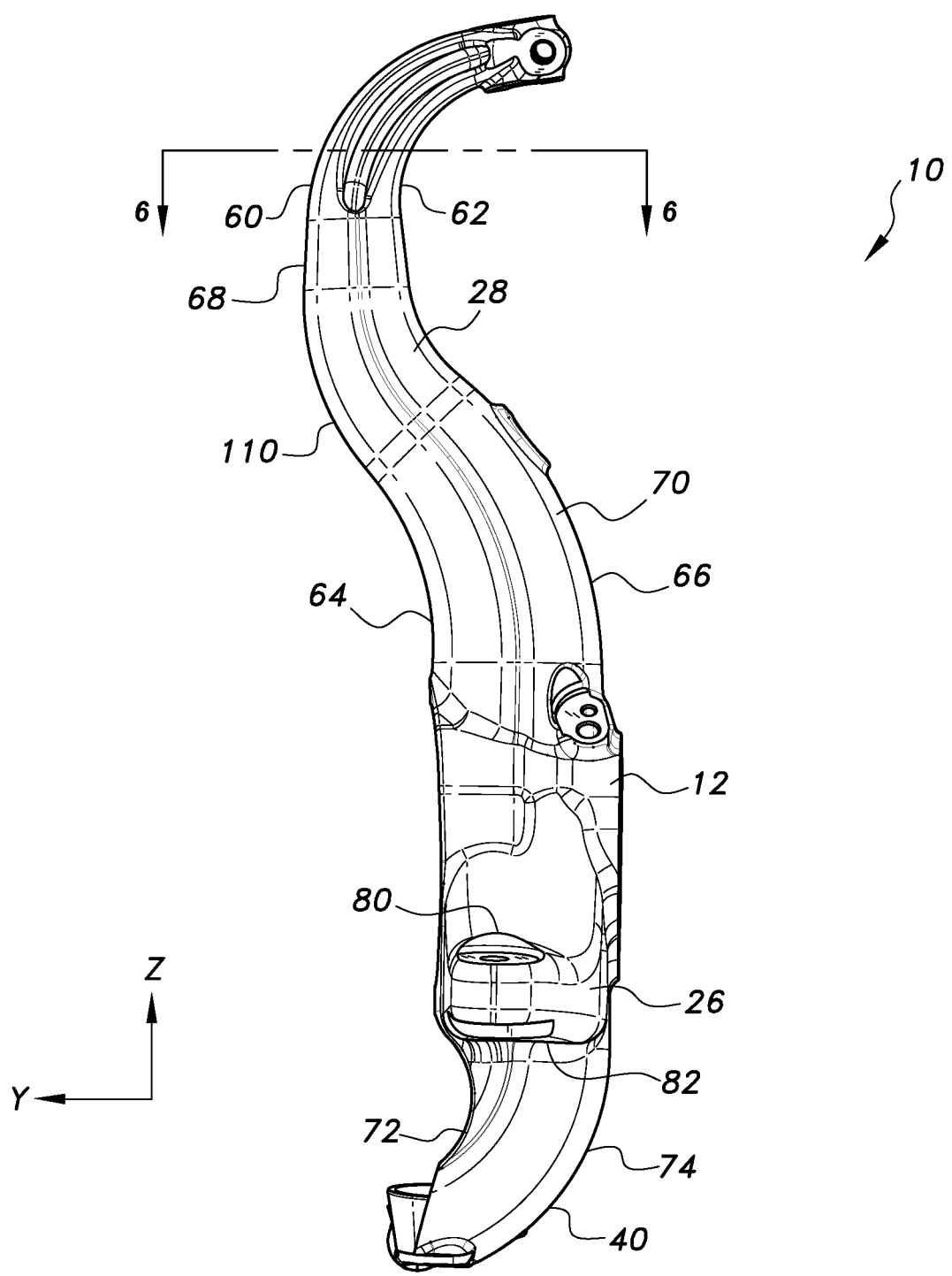
FIG. 4 is a front view of the steering knuckle.

The upper portion 28 has opposed first and second ends 34, 36, respectively, with the first end 34 being joined to the central portion 12. As noted above, upper portion 28 and central portion 12 are, in some embodiments, cast as part of an integral, one-piece body. The upper portion 28 projects vertically from the central portion 12 (i.e., along the Z-axis), with the second end 36 of upper portion 28 being free. As shown in FIG. 4, the upper portion 28 may have a substantially S-shaped curvature, with a second portion 68 of the upper portion 28 having a pair of laterally opposed side edges 60, 62 (i.e., opposed along the Y-axis), each having a cycloidal curvature. Similarly, a first portion 70 of the upper portion 28 has a pair of laterally opposed side edges 64, 66, each also having a cycloidal curvature. It should be understood that side edges 60, 62, 64, 66 may have any suitable contouring, such as, for example, an elliptical curvature (as a non-limiting example). The contouring of each side edge 60, 62, 64, 66 may be defined by a curve that is defined by an equation with a length-to-height ratio between 1.3 and 1.8 inclusive (where length is defined tangent to the curve, with the height being orthogonal to the length), and in which the second derivative is non-zero and continuous. For such curves, the coefficient of determination, $R^2$, in some embodiments, satisfies the requirement that $R^2 \geq 0.98$, when compared to a cycloid or ellipse. Alternatively, a coefficient of determination satisfying the requirement that $R^2 \geq 0.95$, when compared to a cycloid or ellipse, is also contemplated. As described above, with respect to FIG. 13, the curve is, in some embodiments, defined, either fully or partially, by a roulette curve, such as, for example, an ellipse, a parabola, a cycloid, a catenary, or half of a cissoid of Diocles. It should be understood that each side edge 60, 62, 64, 66 may encompass any such curve fully or may be partially contoured as a fraction of such a curve.

Figure 6:
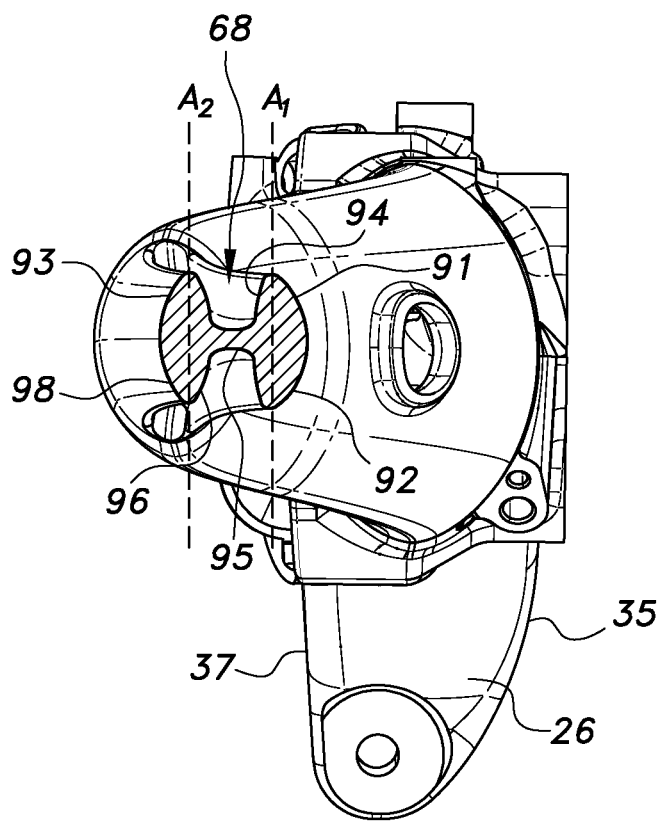
FIG. 6 is a cross-sectional view of an upper portion of the steering knuckle, taken along view lines 6-6 of FIG. 4.
Figure 7:
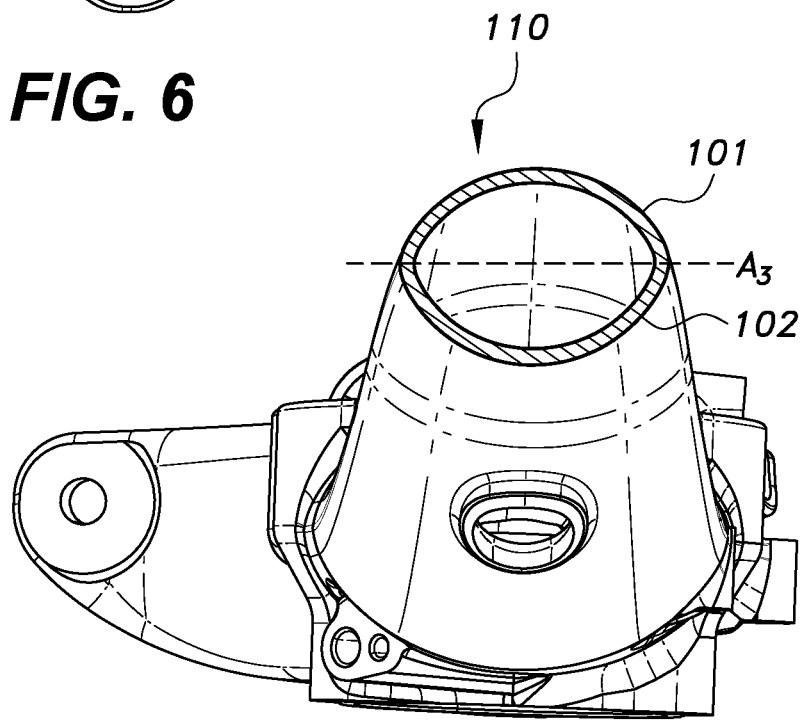
FIG. 7 is a cross-sectional view of the upper portion of the steering knuckle, taken along view lines 7-7 of FIG. 5.

As shown in FIGS. 4 and 6, second portion 68 of upper portion 28 may have a portion with a cross-sectional contour similar to that of an I-beam. As seen in FIG. 6, a pair of lobes 91, 93 are joined by a central neck 95, with the central neck 95 extending laterally (i.e., along the Y-axis), and with each of lobes 91, 93 being elongated longitudinally (i.e., along the X-axis). Major axis $A_1$ bisects lobe 91, and each of the resulting laterally opposed edges 92, 94 preferably defines a cycloid curve (as a non-limiting example, as will be described in greater detail below). Similarly, major axis $A_2$ bisects lobe 93, and each of the resulting laterally opposed edges 96, 98, in some embodiments, also defines a cycloid curve (as a non-limiting example, as will be described in greater detail below). Further, as shown in FIG. 7, a cross-sectional contour of a neck portion 110 of upper portion 28, taken in the longitudinal-lateral plane (i.e., the X-Y plane), defines a larger section similar to one of lobes 91, 93; i.e., major axis $A_3$ symmetrically bisects the neck portion 110 of upper portion 28, and each of the resulting symmetric (or, alternatively, asymmetric) edges 101, 102, in some embodiments, defines a cycloid curve. However, it should be understood that each of the above edges and portions may have any suitable contouring, such as, for example, an elliptical contouring (as a non-limiting example). The contouring of each of the above edges and portions may be defined by a curve that is defined by an equation with a length-to-height ratio between 1.3 and 1.8 inclusive (where length is defined tangent to the curve, with the height being orthogonal to the length), and in which the second derivative is non-zero and continuous. For such curves, the coefficient of determination, $R^2$, in some embodiments, satisfies the requirement that $R^2 \geq 0.98$, when compared to a cycloid or ellipse. Alternatively, a coefficient of determination satisfying the requirement that $R^2 \geq 0.95$, when compared to a cycloid or ellipse, is also contemplated. As described above, with respect to FIG. 13, the curve is, in some embodiments, defined, either fully or partially, by a roulette curve, such as, for example, an ellipse, a parabola, a cycloid, a catenary, or half of a cissoid of Diocles. It should be understood that each of the above portions may encompass any such curve fully or may be partially contoured as a fraction of such a curve.

As shown in FIGS. 1 and 2, a second mounting bracket 38 may be formed on the second end 36 of the upper portion 28. Similar to a conventional steering knuckle, the second mounting bracket 38 may be provided for connection to suspension components for the wheel of the motor vehicle. The upper portion 28 is, in some embodiments, at least partially hollow, thus reducing overall weight of the steering knuckle 10. As indicated in FIGS. 1 and 2, the upper portion 28 is divided into a first portion 70, adjacent the first end 34, and a second portion 68, adjacent the second end 36. The first portion 70, as noted above, is at least partially hollow and may be in open communication with the hollow interior of central portion 12. As described above, with specific reference to FIGS. 4 and 6, the second portion 68 is solid and at least partially defines an I-beam having a substantially I-shaped cross-sectional contour. Further, it should be understood that the general contouring and configuration of upper portion 28 may be varied without departing from the spirit and scope of the present invention. For example, as shown in the alternative embodiment of FIG. 12A, steering knuckle 100 includes an upper portion 128 having an upper end 136 with a modified mounting bracket 138.

The lower portion 40 has opposed first and second ends 42, 44, respectively, with the first end 42 being joined to the central portion 12. As noted above, lower portion 40 and central portion 12 are, in some embodiments, cast as part of an integral, one-piece body. The lower portion 40 is vertically opposed to the upper portion 28 and projects vertically from the central portion 12, with the second end 44 of the lower portion 40 being free. As shown in FIG. 4, the lower portion 40 has a pair of laterally opposed side edges 72, 74

Figure 14:
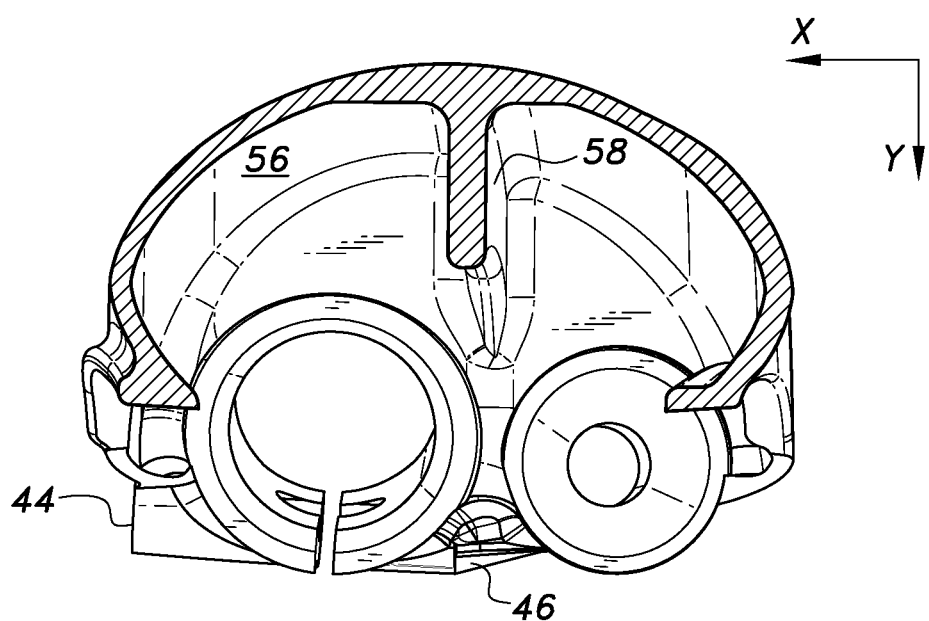
FIG. 14 is a cross-sectional view of a lower portion of the steering knuckle, taken along view lines 14-14 of FIG. 2.

(in the Y-direction). As shown in the lateral-longitudinal cross-sectional view of wall 56, which defines lower portion 40, in FIG. 14, the lateral-longitudinal contouring of wall 56 may be defined by a curve that is defined by an equation with a length-to-height ratio between 1.3 and 1.8 inclusive (where length is defined tangent to the curve, with the height being orthogonal to the length), and in which the second derivative is non-zero and continuous. For such curves, the coefficient of determination, $R^2$, in some embodiments, satisfies the requirement that $R^2 \geq 0.98$, when compared to a cycloid or ellipse. Alternatively, a coefficient of determination satisfying the requirement that $R^2 \geq 0.95$, when compared to a cycloid or ellipse, is also contemplated. As described above, with respect to FIG. 13, the curve is, in some embodiments, defined, either fully or partially, by a roulette curve, such as, for example, an ellipse, a parabola, a cycloid, a catenary, or half of a cissoid of Diocles. It should be understood that the cross-sectional contouring of wall 56, as described above, may encompass any such curve fully or may be partially contoured as a fraction of such a curve.

Additionally, with reference to FIG. 4, the vertical-lateral (Z-Y) contouring of side edge 74 may also be defined by a curve that is defined by an equation with a length-to-height ratio between 1.3 and 1.8 inclusive (where length is defined tangent to the curve, with the height being orthogonal to the length), and in which the second derivative is non-zero and continuous. For such curves, the coefficient of determination, $R^2$, in some embodiments, satisfies the requirement that $R^2 \geq 0.98$, when compared to a cycloid or ellipse. Alternatively, a coefficient of determination satisfying the requirement that $R^2 \geq 0.95$, when compared to a cycloid or ellipse, is also contemplated. As described above, with respect to FIG. 13, the curve is, in some embodiments, defined, either fully or partially, by a roulette curve, such as, for example, an ellipse, a parabola, a cycloid, a catenary, or half of a cissoid of Diocles. It should be understood that the cross-sectional contouring of side edge 74, as described above, may encompass any such curve fully or may be partially contoured as a fraction of such a curve. Further, as shown in FIG. 2, a third mounting bracket 46 is formed on the second end 44 of the lower portion 40. Similar to a conventional steering knuckle, the third mounting bracket 46 may be a pivot mounting bracket, provided for a pivotal connection with the suspension of the motor vehicle.

Further, as shown in FIGS. 2 and 3, the lower portion 40 is defined by wall 56, which forms a partially open shell. A vertical support beam 58 (extending along the vertical direction, or Z-direction) is secured to an inner face of wall 56, as shown. The upper end of vertical support beam 58 is adjacent and contiguous to floor 54, forming an integral, one piece, substantially T-shaped support structure, thus providing vertical, lateral and longitudinal internal support. As described above, the upper portion 28 is, in some embodiments, at least partially hollow, and both central portion 12 and lower portion 40 are each hollow, thus reducing overall weight of the steering knuckle, with internal support being provided by the dual horizontal beam support (i.e., as described above, the dual support provided by horizontal beam 52 in combination with floor 54) and vertical beam 58.

It should be understood that the overall configuration of the steering knuckle 10 may be varied, dependent upon the particular type of vehicle and/or usage of steering knuckle 10. In the previous embodiment, for example, only a single horizontal beam 52 was shown for use in combination with floor 54, thus forming a dual-beam internal horizontal support. It should, however, be understood that any suitable number of internal beams may be used, and that the internal beams may be positioned in any suitable location. In the alternative example of FIG. 12A, steering knuckle 100 includes a floor 154, similar to floor 54, but with horizontal beam 52 being replaced by beam 152 which, as shown, is positioned above aperture 114. Particularly, with respect to this alternative design, beam 152 provides support relating to stiffness of the steering knuckle arm 126, and floor 154 provides support for stiffness of lower portion 140 and/or for the lower portion of central portion 112.

Figure 12A:
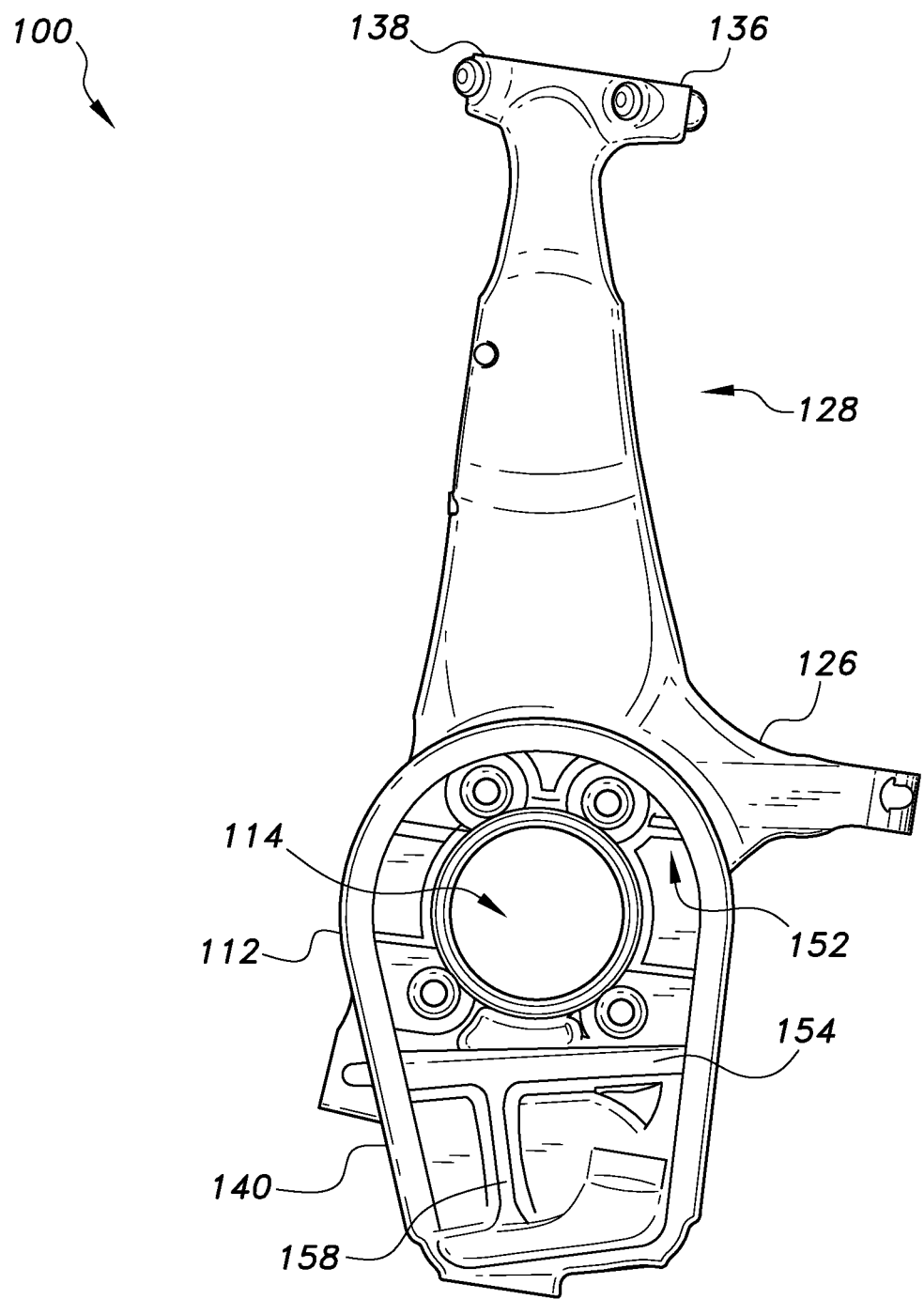
FIG. 12A is an inboard lateral view of an alternative embodiment of the steering knuckle.
Figure 12B:
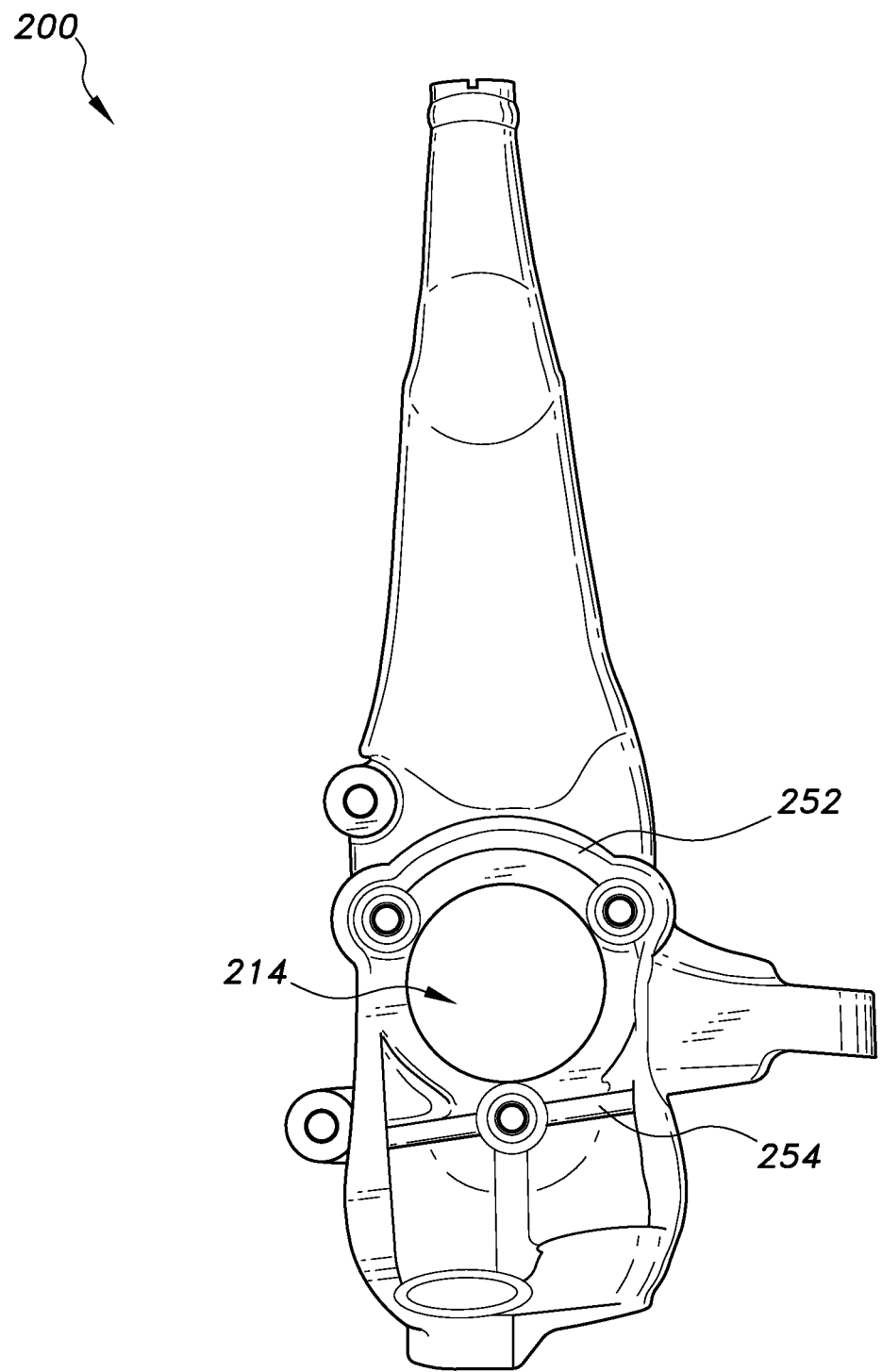
FIG. 12B is an inboard lateral view of a further alternative embodiment of the steering knuckle.

It should be understood that floor 154 and beam 152 are shown for exemplary purposes only, and that these elements, as well as the overall contouring and relative dimensions of central portion 112 may be varied with respect to other features. For example, in steering knuckle 10, a pair of bearing bolt bosses are positioned above aperture 14, and a single bearing bolt boss is connected to horizontal beam 52. In steering knuckle 100 of FIG. 12A, a pair of lower bearing bolt bosses are formed above floor 154, but beneath aperture 114, and a pair of upper bearing bolt bosses are formed above aperture 114, contiguous with beam 152. It should be understood that this represents an exemplary configuration only. Similarly, it should be understood that lower portion 140 may have any suitable overall configuration and relative dimensions. In FIG. 12A, for example, vertical support 158 is shown with an alternative configuration and location with respect to vertical support 58 of steering knuckle 10. Similarly, steering knuckle 200 of FIG. 12B shows another example of an alternative configuration, particularly with regard to the angling of floor 254 (corresponding to floors 54 and 154) and in the usage of a substantially arcuate lateral support beam 252 positioned above aperture 214.

Figure 8:
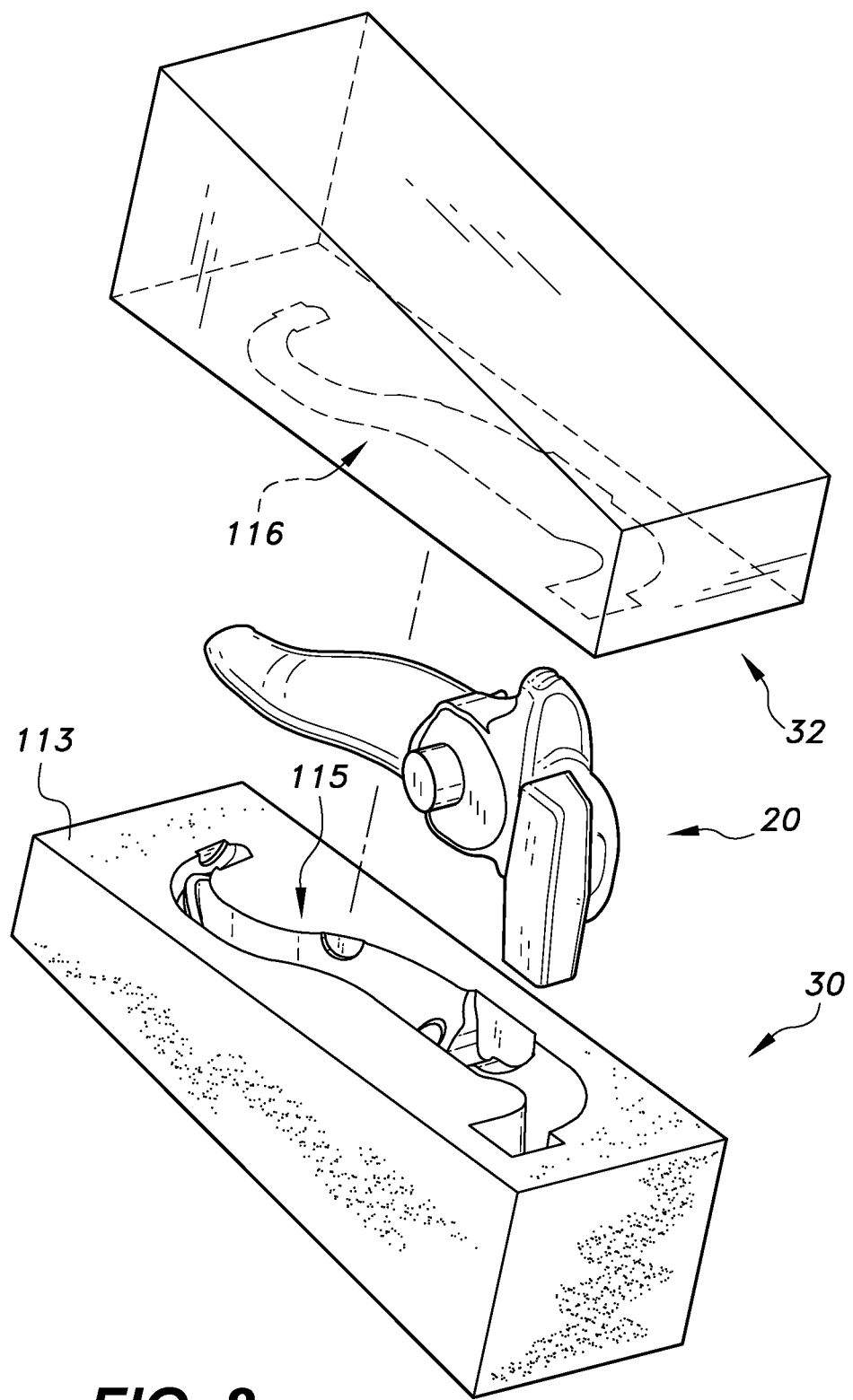
FIG. 8 illustrates a step of a method of making the steering knuckle, showing insertion of a removable core within a casting mold.
Figure 9:
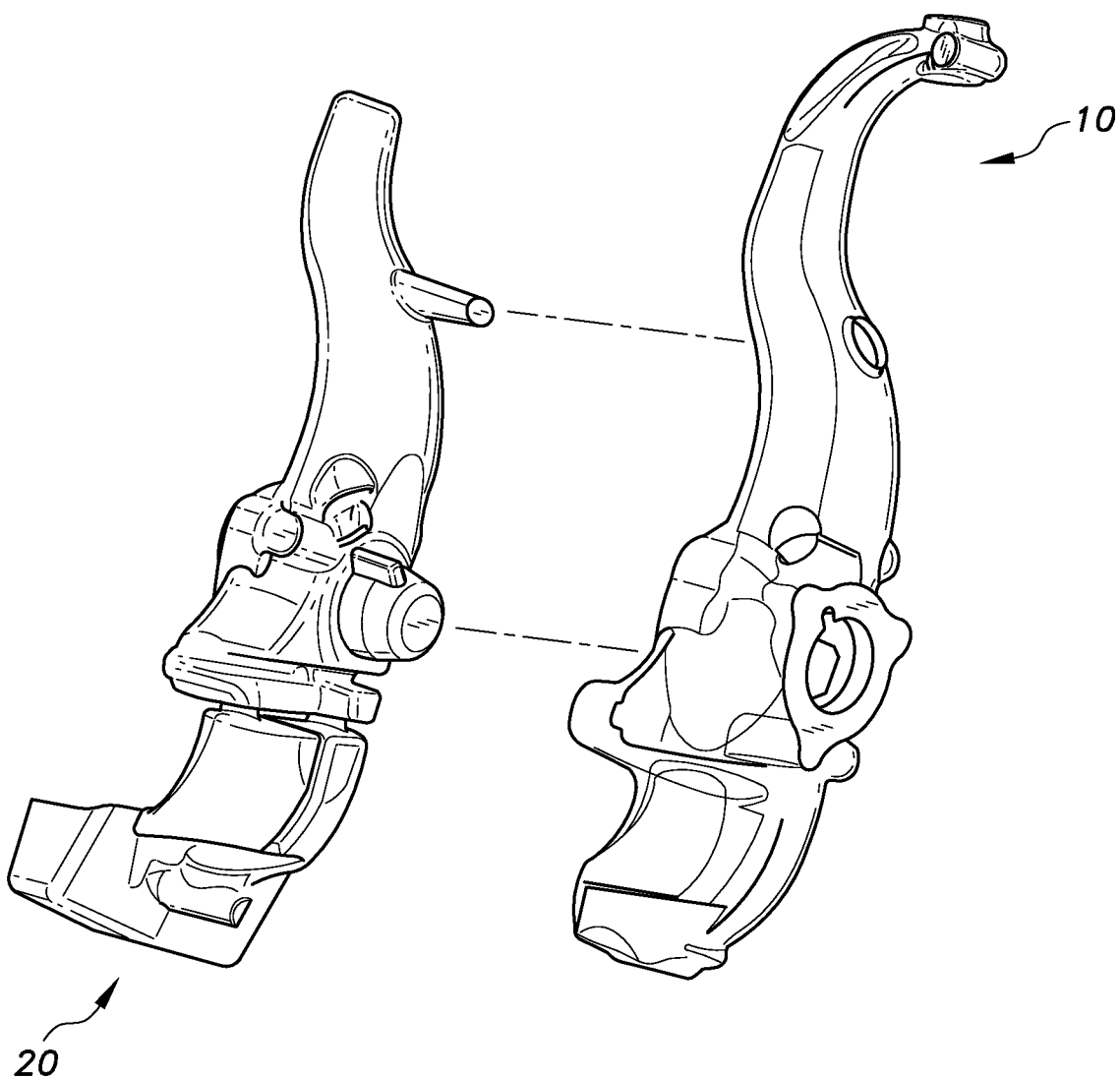
FIG. 9 illustrates a further step of the method of making the steering knuckle, showing separation of the removable core from the steering knuckle.

As illustrated in FIGS. 8 and 9, the steering knuckle 10 may be manufactured by a casting process. As is known in sand casting, a casting mold is defined by drag (or lower) and cope (or upper) portions 30, 32, respectively. Each of the cope and drag portions 30, 32 contain molding sand 112, with drag and cope molds (i.e., molding cavities) 115, 116 being respectively defined in the drag and cope portions 30, 32 of the casting mold. When the drag and cope portions 30, 32 are placed together, the drag and cope molds 115, 116 define an overall molding cavity.

A removable core 20, formed from compressed sand or the like, is placed in the molding cavity and, similar to a conventional sand casting process, the molding cavity is filled with molten metal. The molten metal is allowed to cool, solidifying into the steering knuckle 10, as described above. The drag and cope portions 30, 32 of the casting mold are parted, and the removable core 20 and steering knuckle 10 are removed from the casting mold. As illustrated in FIG. 9, the removable core 20 is separated from the steering knuckle 10, yielding the end product; i.e., steering knuckle 10.

Figure 10:
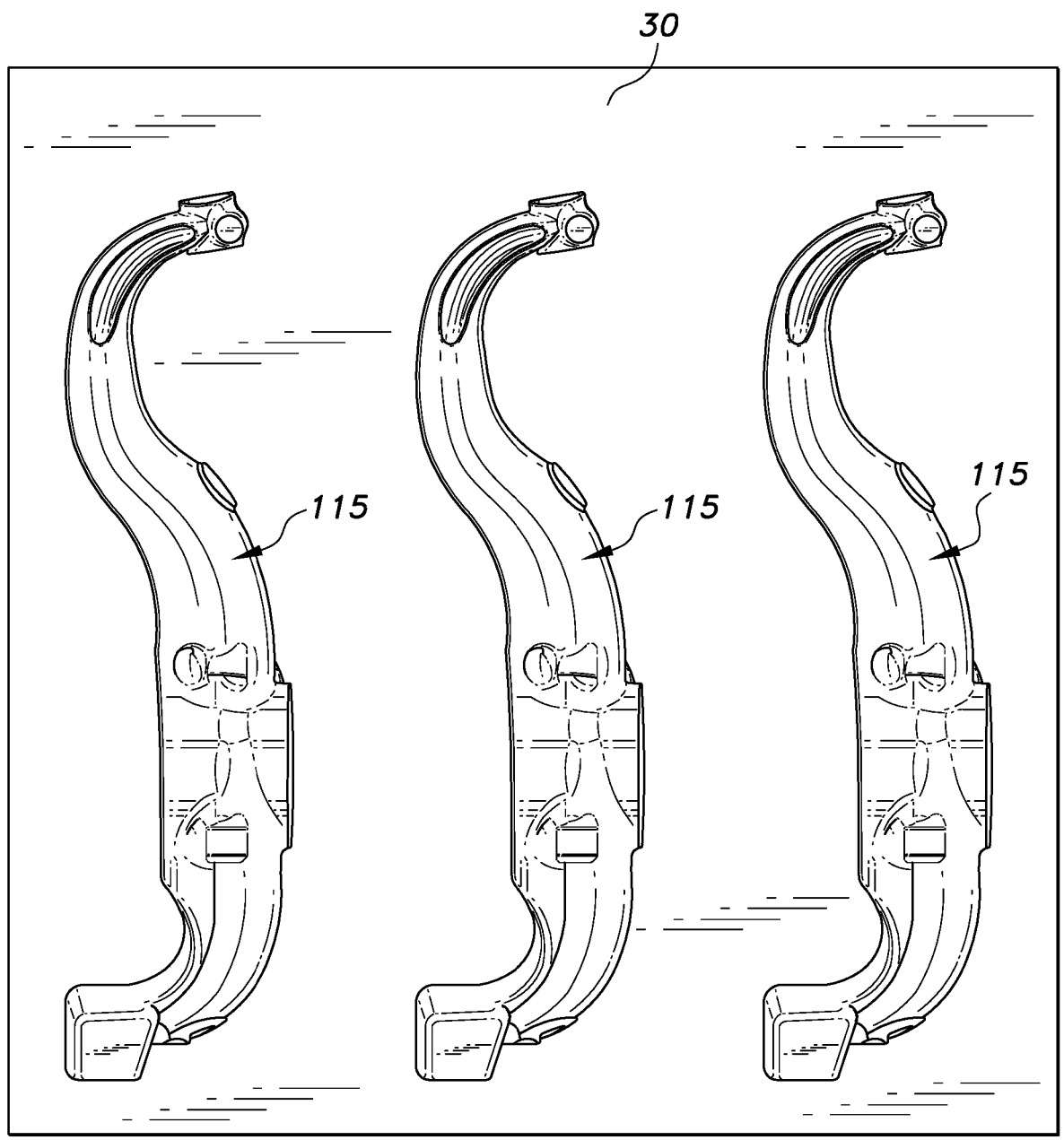
FIG. 10 is a top view of a drag portion of a casting mold, used in a single cavity configuration of a multi-cavity method of making the steering knuckle.

In FIG. 8, a single molding cavity is shown formed in the casting mold. As shown in FIG. 10, multiple molding cavities may be defined in a single casting mold. FIG. 10 only shows the drag portion 30 with a plurality of drag molds 115, although it should be understood that this view is provided for purposes of simplicity and illustration, and that the corresponding cope portion would similarly have a plurality of cope molds. As shown, the molds are oriented such that the vertical-longitudinal plane (i.e., the Z-X plane) of the steering knuckle 10 is perpendicular to the parting line (i.e., the lateral-vertical, or Y-Z, plane). As best seen in FIGS. 1 and 4, the lateral width of steering knuckle 10 is substantially less than the longitudinal width. Thus, by orienting the cavities such that the vertical-longitudinal plane of the steering knuckle 10 is perpendicular to the parting line, multiple molding cavities may be easily formed in a single casting mold, allowing for multiple ones of steering knuckle 10 to be simultaneously manufactured in a single casting mold. In addition to this enhanced production capacity, the exemplary cycloidal contouring of the steering knuckle 10, as described above, provides draft to the surfaces perpendicular to the parting line, allowing the removable core 20 and steering knuckle 10 to be easily removed from the molding cavity without adding weight for draft. As described above, with respect to FIG. 13, the curve is, in some embodiments, defined, either fully or partially, by a roulette curve, such as, for example, an ellipse, a parabola, a cycloid, a catenary, or half of a cissoid of Diocles.

It is to be understood that the steering knuckle and method of making the same is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

What is claimed is:

1. A steering knuckle, comprising:
a central portion;
a steering knuckle arm having opposed first and second ends, the first end thereof being joined to the central portion, the steering knuckle arm projecting longitudinally from the central portion with the second end of the steering knuckle arm being free;
an upper portion having opposed first and second ends, the first end thereof being joined to the central portion, the upper portion projecting vertically from the central portion with the second end of the upper portion being free, wherein a cross-sectional contour of the upper portion in a longitudinal-lateral plane defines a pair of curves having first and second curvatures respectively associated therewith, wherein each of the first and second curvatures is defined at least partially by a first roulette curve; and
a lower portion having opposed first and second ends, the first end thereof being joined to the central portion, the lower portion being vertically opposed to the upper portion and projecting vertically from the central portion with the second end of the lower portion being free,
wherein the cross-sectional contour of the upper portion includes a pair of edges and a hollow area surrounded by the pair of edges;
the pair of edges constitute a closed loop; and
wherein the first roulette curve has length-to-height ratio associated therewith ranging between 1.3 and 1.8 inclusive.

2. The steering knuckle of claim 1, wherein the first roulette curve has a coefficient of determination greater than or equal to 0.98 when compared against a comparative curve, wherein the comparative curve is selected from the group consisting of an ellipse and a cycloid.

3. The steering knuckle of claim 1, wherein the first roulette curve has a coefficient of determination greater than or equal to 0.95 when compared against a comparative curve, wherein the comparative curve is selected from the group consisting of an ellipse and a cycloid.

4. The steering knuckle of claim 1, wherein the upper portion is divided into a first portion adjacent the first end and a second portion adjacent the second end, the first portion of the upper portion having a pair of laterally opposed side edges, each having a first curvature associated therewith, and the second portion of the upper portion having a pair of laterally opposed side edges, each having a second curvature associated therewith, wherein each of the first and second curvatures of the laterally opposed side edges of the first portion of the upper portion and the second portion of the upper portion, respectively, is defined at least partially by a second roulette curve.

5. The steering knuckle of claim 4, wherein the second roulette curve has length-to-height ratio associated therewith ranging between 1.3 and 1.8 inclusive.

6. The steering knuckle of claim 4, wherein the second roulette curve has a coefficient of determination greater than or equal to 0.98 when compared against a comparative curve, wherein the comparative curve is selected from the group consisting of an ellipse and a cycloid.

7. The steering knuckle of claim 4, wherein the second roulette curve has a coefficient of determination greater than or equal to 0.95 when compared against a comparative curve, wherein the comparative curve is selected from the group consisting of an ellipse and a cycloid.

8. The steering knuckle of claim 1, wherein the steering knuckle arm has vertically opposed upper and lower side edges.

9. The steering knuckle of claim 8, wherein a vertical-longitudinal cross-sectional contour of the upper side edge of the steering knuckle arm is defined at least partially by a third roulette curve.

10. The steering knuckle of claim 9, wherein the third roulette curve has length-to-height ratio associated therewith ranging between 1.3 and 1.8 inclusive.

11. The steering knuckle of claim 9, wherein the third roulette curve has a coefficient of determination greater than or equal to 0.98 when compared against a comparative curve, wherein the comparative curve is selected from the group consisting of an ellipse and a cycloid.

12. The steering knuckle of claim 9, wherein the third roulette curve has a coefficient of determination greater than or equal to 0.95 when compared against a comparative curve, wherein the comparative curve is selected from the group consisting of an ellipse and a cycloid.

13. The steering knuckle of claim 8, wherein a vertical-lateral cross-sectional contour of the upper side edge and the lower side edge of the steering knuckle arm are each defined at least partially by fourth and fifth respective roulette curves.

14. The steering knuckle of claim 13, wherein each of the fourth and fifth roulette curves has length-to-height ratio associated therewith ranging between 1.3 and 1.8 inclusive.

15. The steering knuckle of claim 13, wherein each of the fourth and fifth roulette curves has a coefficient of determination greater than or equal to 0.98 when compared against a comparative curve, wherein the comparative curve is selected from the group consisting of an ellipse and a cycloid.

16. The steering knuckle of claim 13, wherein each of the fourth and fifth roulette curves has a coefficient of determination greater than or equal to 0.95 when compared against a comparative curve, wherein the comparative curve is selected from the group consisting of an ellipse and a cycloid.

17. The steering knuckle of claim 1, wherein the steering knuckle arm has laterally opposed first and second side edges, the first side edge of the steering knuckle arm having a lateral-longitudinal cross-sectional contour defined by a sixth roulette curve.

18. The steering knuckle of claim 17, wherein the sixth roulette curve has length-to-height ratio associated therewith ranging between 1.3 and 1.8 inclusive.

19. The steering knuckle of claim 17, wherein the sixth roulette curve has a coefficient of determination greater than or equal to 0.98 when compared against a comparative curve, wherein the comparative curve is selected from the group consisting of an ellipse and a cycloid.

20. The steering knuckle of claim 17, wherein the sixth roulette curve has a coefficient of determination greater than or equal to 0.95 when compared against a comparative curve, wherein the comparative curve is selected from the group consisting of an ellipse and a cycloid.

21. The steering knuckle of claim 1, wherein the lower portion comprises at least one wall defining a partially open shell, a lateral-longitudinal cross-sectional contour of the at least one wall defining a seventh roulette curve.

22. The steering knuckle of claim 21, wherein the seventh roulette curve has length-to-height ratio associated therewith ranging between 1.3 and 1.8 inclusive.

23. The steering knuckle of claim 21, wherein the seventh roulette curve has a coefficient of determination greater than or equal to 0.98 when compared against a comparative curve, wherein the comparative curve is selected from the group consisting of an ellipse and a cycloid.

24. The steering knuckle of claim 21, wherein the seventh roulette curve has a coefficient of determination greater than or equal to 0.95 when compared against a comparative curve, wherein the comparative curve is selected from the group consisting of an ellipse and a cycloid.

25. A steering knuckle, comprising:
a central portion;
a steering knuckle arm having opposed first and second ends, the first end thereof being joined to the central portion, the steering knuckle arm projecting in a first direction from the central portion with the second end of the steering knuckle arm being free;
an upper portion having opposed first and second ends, the first end thereof being joined to the central portion, the upper portion projecting vertically from the central portion with the second end of the upper portion being free, wherein the upper portion is divided into a first portion adjacent the first end and a second portion adjacent the second end, the first portion being at least partially hollow, and the second portion being solid, the second portion at least partially defining an I-beam having a substantially I-shaped cross-sectional contour; and
a lower portion having opposed first and second ends, the first end thereof being joined to the central portion, the lower portion being vertically opposed to the upper portion and projecting vertically from the central portion with the second end of the lower portion being free,
wherein the I-shaped cross-sectional contour includes a pair of lobes extending in the first direction and a central web extending in a second direction orthogonal to the first direction.

26. The steering knuckle of claim 25, wherein the central portion has an aperture formed therethrough.

27. The steering knuckle of claim 26, wherein the central portion is hollow and has an open end, the open end being laterally opposed to the aperture.

28. The steering knuckle of claim 25, wherein the lower portion comprises at least one wall defining a partially open shell.

29. The steering knuckle of claim 25, further comprising: a first mounting bracket formed on the second end of the steering knuckle arm; a second mounting bracket formed on the second end of the upper portion; and a third mounting bracket formed on the second end of the lower portion.

30. The steering knuckle of claim 25, wherein the central portion has a floor, the floor separating the central portion from the lower portion.

31. The steering knuckle of claim 30, further comprising at least one longitudinally-extending beam mounted in the central portion, wherein the at least one longitudinally-extending beam and the floor provide internal longitudinal and lateral support.

32. The steering knuckle of claim 31, further comprising a vertical support beam mounted in the lower portion and extending substantially vertically, an upper end of the vertical support beam being positioned adjacent and contiguous to the floor to define an integral, one piece, substantially T-shaped internal support structure to provide internal longitudinal, lateral and vertical support.

33. The steering knuckle of claim 25, wherein a cross-sectional contour of the upper portion in a longitudinal-lateral plane defines a pair of curves having first and second curvatures respectively associated therewith, wherein each of the first and second curvatures is defined at least partially by a first roulette curve.

34. A method of making a steering knuckle, comprising the steps of:
providing a casting mold having cope and drag mold portions, wherein cope and drag molds are respectively defined in the cope and drag mold portions of the casting mold, the cope and drag molds defining a molding cavity, wherein a vertical-lateral parting plane is defined between the cope and drag mold portions of the casting mold;
inserting a removable core in the molding cavity, wherein a longitudinal-vertical plane of the removable core and a longitudinal-vertical plane of the molding cavity are each orthogonal to the parting plane; filling the molding cavity with molten metal;
cooling the molten metal to form a solidified metal structure defining a steering knuckle; parting the cope and drag mold portions of the casting mold, wherein the steering knuckle includes a central portion; a steering knuckle arm having opposed first and second ends, the first end thereof being joined to the central portion; an upper portion having opposed first and second ends; and a lower portion having opposed first and second ends, the first end thereof being joined to the central portion, wherein the upper portion is divided into a first portion adjacent the first end and a second portion adjacent the second end, the first portion being at least partially filled with the removable core, and the second portion being solid;
removing the removable core and the steering knuckle from the casting mold; and
separating the removable core from the steering knuckle.

35. The method of making a steering knuckle of claim 34, wherein the steering knuckle has a central portion, a steering knuckle arm, an upper portion, a lower portion, and a floor separating the central portion from the lower portion.

36. The method of making a steering knuckle of claim 35, further comprising the steps of:
the removable core forming at least one longitudinally-extending beam mounted in the central portion of the steering knuckle for providing internal longitudinal and lateral support;

the removable core forming a vertical support beam mounted in the lower portion and extending substantially vertically, such that an upper end of the vertical support beam is positioned adjacent and contiguous to the floor to define an integral, one piece, substantially T-shaped internal support structure to provide internal longitudinal, lateral and vertical support; and the removable core forming at least one wall in the lower portion, such that the at least one wall defines a partially open shell.

37. The method of making a steering knuckle of claim 34, wherein the central portion has a floor, the floor separating the central portion from the lower portion; and at least one longitudinally-extending beam mounted in the central portion, wherein the at least one longitudinally-extending beam and the floor provide internal longitudinal and lateral support.

38. The method of making a steering knuckle of claim 34, wherein the second portion at least partially defines an I-beam having a substantially I-shaped cross-sectional contour.

39. The method of making a steering knuckle of claim 34, wherein the second portion at least partially defines an I-beam having a substantially I-shaped cross-sectional contour.

40. The method of making a steering knuckle of claim 34, wherein a cross-sectional contour of the upper portion in a longitudinal-lateral plane defines a pair of curves having first and second curvatures respectively associated therewith, wherein each of the first and second curvatures is defined at least partially by a first roulette curve.

\* \* \* \* \*